(12) United States Patent
Reeves (10) Patent No.: US 7,404,472 B2
(45) Date of Patent: *Jul. 29, 2008

(54) DISC BRAKE CALIPER

(75) Inventor: Keith Clarkson Reeves, Mount Eliza (AU)

(73) Assignee: PBR Australia PTY Ltd, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/921,631

(22) Filed: Aug. 19, 2004

(65) Prior Publication Data

US 2005/0077124 A1    Apr. 14, 2005

Related U.S. Application Data

(63) Continuation of application No. PCT/AU03/00224, filed on Feb. 21, 2003.

(30) Foreign Application Priority Data

Feb. 21, 2002    (AU) .................................... PS 0668

(51) Int. Cl.
    *F16D 55/228*    (2006.01)
(52) U.S. Cl. ..................... 188/72.5; 188/72.1
(58) Field of Classification Search ................ 188/72.4, 188/72.5, 72.1, 72.2, 72.3, 72.6, 366–369
    See application file for complete search history.

(56) References Cited

U.S. PATENT DOCUMENTS 3,051,272 A * 8/1962 Burnett .................... 188/73.34
3,183,999 A * 5/1965 Buyze et al. ............... 188/18 A
3,442,354 A * 5/1969 Belart ........................ 188/71.9
3,486,589 A   12/1969 Hillegass .................. 188/73.32
3,602,328 A    8/1971 Fannin ...................... 188/72.5

(Continued)

FOREIGN PATENT DOCUMENTS

| EP | 597893 | 8/1999 |
| FR | 2680214 | 2/1993 |
| WO | WO 98/55778 | 12/1998 |

OTHER PUBLICATIONS

Translated abstract of EP document No. 0597893 dated May 25, 1994.*

*Primary Examiner*—Pam Rodriguez
(74) *Attorney, Agent, or Firm*—Ohlandt, Greeley, Ruggiero & Perle L.L.P.

(57) ABSTRACT

An opposed piston disc brake caliper has a caliper housing arranged for mounting brake shoes on each of opposite sides of a rotor. The rotor in use is disposed between the brake shoes with each brake shoe having a backing plate and a friction lining applied to the backing plate. The caliper housing has side walls extending generally in a plane parallel to a plane of the rotor and on opposite sides of the plane of the rotor which accommodate a piston. The caliper housing has mounting members for engagement with each of the side edges of each backing plate between the radially inner edge and the radially outer edge of the friction lining. The engagement is such as to substantially limit movement of each brake shoe other than in a direction toward or away from the rotor with at least one of the mounting members being removable from the caliper housing to facilitate removal of the brake shoe from the caliper housing.

22 Claims, 6 Drawing Sheets

U.S. PATENT DOCUMENTS

| | | | |
|---|---|---|---|
| 4,344,511 A * | 8/1982 | Stoka et al. | 188/73.45 |
| 4,351,421 A * | 9/1982 | Kurata et al. | 188/73.45 |
| 4,392,560 A * | 7/1983 | Nakasu et al. | 188/73.34 |
| 4,446,948 A * | 5/1984 | Melinat | 188/73.45 |
| 4,905,796 A * | 3/1990 | Schonenberger et al. | 188/73.39 |
| 5,067,595 A | 11/1991 | Weiler et al. | 188/73.45 |
| 5,096,023 A * | 3/1992 | Thiel et al. | 188/73.36 |
| 5,103,939 A | 4/1992 | Schroeter | 188/72.4 |
| 5,257,679 A * | 11/1993 | Weiler et al. | 188/73.32 |
| 5,477,944 A | 12/1995 | Bryan et al. | 188/72.5 |
| 5,538,105 A | 7/1996 | Rike | 188/73.32 |
| 5,620,063 A * | 4/1997 | Smith | 188/73.2 |
| 5,810,121 A * | 9/1998 | Anger et al. | 188/72.5 |

* cited by examiner

DISC BRAKE CALIPER

CROSS REFERENCE TO RELATED APPLICATIONS

The present application is a Continuation Patent Application under 35 U.S.C. § 111(a) of International Application PCT/AU03/00224 with an International Filing Date of Feb. 21, 2003 and hereby claims priority to Australian Patent Application PS 0668 filed on Feb. 21, 2002.

BACKGROUND OF THE INVENTION

1. Field of the Invention

The present invention relates to disc brake calipers and to improvements thereof. The present invention has particular relevance to disc brake calipers of the kind which include opposed pistons and it will therefore be convenient to describe the invention in relation to that type of caliper. It is to be appreciated however, that the invention could apply to calipers not of the opposed piston kind.

2. Description of Related Art

Opposed piston calipers have traditionally been applied to high performance vehicles, such as racing cars and top end sports cars. Such calipers have been perceived as providing higher performance than non-opposed piston calipers.

When used in high performance cars, the brake shoes of the caliper are supported on torque abutments positioned on the radially inward edge of the shoe (relative to the rotor), and a spring bias operates on the opposite or radially outer edge of the shoe to resist movement of the shoe away from one or each of the abutments during braking. The calipers are arranged in this manner, so that the brake shoes can be removed quickly after the spring or springs are removed, through an opening in the radially outer part of the caliper housing. However, the springs are required to be highly loaded to resist the signification loads applied by the brake shoes during braking. This does mean that the disassembly and reassembly of the caliper requires some expertise if it is to be done in a quick manner. This is one reason why the calipers have generally been used on high performance vehicles only.

Given the need for an opening in the housing for brake shoe removal, known opposed piston calipers such as those described above, have not been as stiff as desirable. Caliper stiffness is always a characteristic that is desirable to be maximised.

In known disc brake calipers friction lining wear tends to occur in a tapered manner, with the wear being maximum at the leading end of each shoe and tapering to minimum wear at the trailing ends. To eliminate or reduce the amount of tapering wear, ie to cause the friction lining to wear evenly or more evenly, some calipers have employed multiple pistons to drive the brake shoe, with a piston of greater diameter at the trailing end of the brake shoe compared to the leading end. Accordingly, greater pressure is applied to the brake shoe at the trailing end than the leading end, so having an evening effect on the friction lining wear. A drawback associated with this approach is that each caliper requires at least two different piston sizes and related seals and other parts, so complicating the manufacture and assembly process and therefore increasing costs.

BRIEF SUMMARY OF THE INVENTION

It is an object of the invention to overcome or at least alleviate one or more of the drawbacks associated with the prior art.

According to the present invention there is provided an opposed piston disc brake caliper which includes a caliper housing arranged for mounting brake shoes on each of opposite sides of a rotor which in use is disposed between said brake shoes, each said brake shoe having radially inner and outer edges when mounted in said housing and side edges extending therebetween, a piston associated with each said brake shoe and being operable in use to shift the respective brake shoe toward the rotor for engagement therewith to effect braking, and mounting members extending from said side walls of said housing toward said rotor and being provided for engagement with each said side edge of each said brake shoe and the engagement being such as to substantially limit movement of each said brake shoe other than in a direction toward or away from the rotor, at least one of said mounting members engaged with each said brake shoe being removable from said housing to facilitate removal of a said brake shoe from said housing.

In a preferred arrangement, two or more brake shoes are mounted in the housing on each side of the rotor. In this arrangement, a piston is associated with each brake shoe and sufficient mounting members are provided for engagement of the side edges of each brake shoe. In one such preferred arrangement, a pair of brake shoes are provided adjacent one another on each side of the rotor and in this arrangement, three mounting members are provided, one to engage each of the outer side edges of each brake shoe and the third to engage the side edges of the brake shoes which are adjacent. In this arrangement, the central or third mounting member can be removable, whereby removal of that member alone can facilitate removal of the pair of brake shoes from the housing. That is, the arrangement can be such that by removal of the central or third mounting member, the restraint against movement of the brake shoes by the mounting members is lifted, so that the brake shoes can then be removed.

In a further arrangement, three brake shoes are provided adjacent one another on each side of the rotor. Accordingly, four mounting members can be provided, one at each end of the adjacent brake shoes and one disposed between each of the two pairs of adjacent side edges. In this arrangement, the mounting members disposed between the two pairs of adjacent side edges can be removed for removal of each of the three brake shoes.

It will be appreciated that any number of brake shoes and associated mounting members may be provided and that for brake shoe removal, mounting members disposed between adjacent side edges of adjacent brake shoes normally will be required to be removed for brake shoe removal. Alternatively however, each of the mounting members may be removable, and this may be desirable not only to provide flexibility in which members may be removed, but also to maximise the number of like parts in the caliper.

In an alternative arrangement, some of the mounting members may be fixed against removal and for example, one or more of the mounting members may be cast as part of the housing. Alternatively, those members may be disposed as a friction fit in openings formed in the housing. The number of fixed mounting members is however limited by the requirement for brake shoe removal.

In a preferred arrangement, one or more of the mounting members is threadably received in an opening in the housing. Preferably the opening extends fully through the housing so that the member is threaded into the opening from the outside of the housing, thereby facilitating removal of the member from the outside. The or each member may therefore be formed as threaded stud or the like, with an outwardly exposed head which includes a suitable configuration for engagement with a driving tool, such as a spanner.

The mounting members may engage the side edges of the brake shoes in any suitable manner to limit brake shoe movement as required. In one preferred arrangement, the backing plate of the brake shoes include a slot or groove formed in a side edge and the mounting member has an outer surface to snugly engage that slotted or grooved surface. The slot or groove may have any suitable shape, such as concave, while the mounting member, at least in the region of the backing plate may be circular in cross-section. In this arrangement, the slot or groove may be of a radius slightly greater than that of the mounting member for a snug fit about the mounting member. The slot or groove may however be otherwise shaped.

The engagement between the mounting member and the brake shoe may alternatively be the opposite to that discussed above, so that the mounting member includes a slot or groove and the backing plate incudes a protrusion which is a snug fit in the slot or groove.

The mounting members must extend from the housing to maintain engagement of the brake shoes during movement thereof into engagement with the rotor. That movement will be a minimum when the friction lining of the brake shoe is new and at a maximum when the friction lining has worn. The amount of movement will vary but typically the maximum movement when the friction lining has worn will be in the order of 2 to 3 mm.

The brake shoes preferably are of identical shape to minimise different parts. The brake shoes typically are of generally rectangular or square construction, and if multiple brake shoes are employed on each side of the rotor, they preferably have a combined length approximately equal to that of a single brake shoe. The number of brake shoes can vary as discussed above, and one arrangement that has been envisaged includes a six brake shoe caliper (three brake shoes on each side of the rotor) for the front wheels of a vehicle and a four brake shoe caliper for rear wheels thereof. It is possible to have different numbers of shoes on each side of the rotor if desirable, such as a traditional single shoe on one side and a pair of shoes on the other. The invention therefore is not restricted to even numbers of brake shoes.

The caliper arrangement of the invention preferably includes biasing means for biasing the brake shoes against rattling movement and for this, a light spring may be employed to bias the brake shoes into engagement with the mounting members against rattling. The biasing force required for this can be substantially less than the spring employed in the prior art discussed above, because it has a very different purpose and is not required to resist the substantial loading of the prior art caliper during braking.

The housing can include side walls which extend generally in planes parallel to the plane of the rotor and which accommodate the pistons, and end walls which extend transverse to the side walls and are connected therebetween, such that the respective walls define an opening. A bar can extend across the opening transverse to the side walls for increasing the stiffness of the housing against outward bending of the side walls during braking. In this embodiment, a plurality of brake shoes are provided on each side of the rotor, and the brake shoes are removable from the housing through the opening past the bar when the caliper is installed about a rotor.

The above embodiment is advantageous by the provision of both the plurality of brake shoes on each side of the rotor and the transverse bar which traverses the housing opening. In the prior art, a transverse bar could not be employed with single brake shoes disposed on either side of the rotor, because the bar prevented brake shoes being removed from the caliper through the opening. However, brake shoes of lesser length parallel to the plane of the rotor can be removed through the housing on either side of the bar.

There can be more than a single transverse bar if the relative dimensions of the opening and the brake shoes permit. In a six brake shoe caliper, the length of the housing in the plane of the rotor can be greater than in a four brake shoe caliper and a pair of transverse bars may be employed in a six brake shoe caliper, whereas a single bar may be employed in a four brake shoe caliper.

In a preferred arrangement, the caliper includes, first mounting means for mounting the brake shoes within the housing, and second mounting means for mounting the caliper to a wheel assembly. The second mounting means extends from the housing on one side of the rotor, and the housing includes side walls which extend generally in planes parallel to the plane of the rotor and which accommodate the pistons, and end walls which extend transverse to the side walls and are connected therebetween. An axial extension extends from the housing axially toward the rotor adjacent the radially inner brake shoe edge and fully along the side wall to connect with each of the end walls and is disposed on the side of the rotor opposite to that of the second mounting means.

The above arrangement provides for increased stiffness of the caliper housing by the provision of the axial extension. The axial extent of the extension determines the increase in stiffness achieved over a caliper in which the axial extension is absent, but the maximum extent is determined by a need to avoid engagement with the rotor.

A major increase in the stiffness of the housing is realised by a single axial extension, which extends along the side wall described, although additional stiffness can be realised by a second axial extension extending from the opposite side wall and in connection with each of the end walls and adjacent the radially inner brake shoe edge of the brake shoe or shoes on that side of the rotor. The increased stiffness provided by the second axial extension is less than that provided by the first axial extension, because the second mounting means already contributes some stiffness to that side wall of the housing.

The or each axial extension can have any suitable configuration but preferably each has a generally square or rectangular configuration.

In a preferred embodiment, the housing includes side walls which extend generally in planes parallel to the plane of the rotor and which include piston bores for accommodating each piston, and wherein each of the piston bores has the same diameter and axial extent and each piston has the same diameter and length, so that during braking, equal pressure is applied to each brake shoe.

In the above embodiment, caliper costs can be reduced by the piston arrangements being identical, rather than different. Such an arrangement previously would have not been desirable, because the friction lining would wear in a tapered profile as discussed earlier. However, by employing a plurality of brake shoes on each side of the rotor, the shortened length of each brake shoe in the direction of rotor rotation, means that while the friction lining of each shoe will still wear in a tapered profile, the extent of tapered wear will be lessened. Accordingly, the friction lining will wear more evenly and will therefore have an extended life.

BRIEF DESCRIPTION OF THE SEVERAL VIEWS OF THE DRAWINGS

The attached drawings show an example embodiment of the invention of the foregoing kind. The particularity of those drawings and the associated description does not supersede the generality of the preceding broad description of the invention.

DETAILED DESCRIPTION OF THE INVENTION

Figure 1:
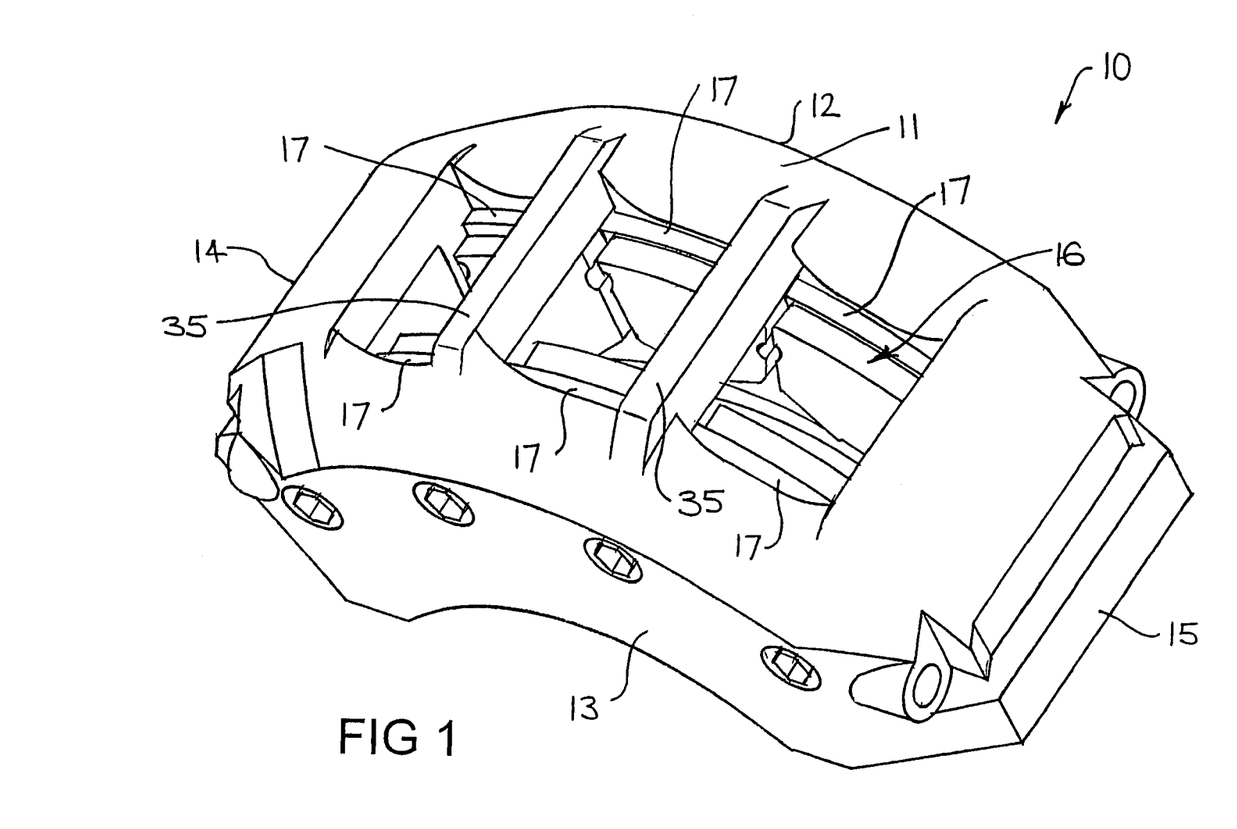
FIG. 1 is a perspective view of a disc brake caliper according to the invention.

FIG. 1 shows a disc brake caliper according to the invention as described above. The disc brake caliper 10 includes a housing 11 defining a pair of parallel side walls 12 and 13 and a pair of end walls 14 and 15 which extend transversely to the side walls 12 and 13 and are connected thereto. The housing 11 has a generally rectangular configuration in plan view and typically would be cast in a suitable metal such as iron or aluminium. The housing would then be machined as necessary.

The side walls 12 and 13 and the end walls 14 and 15 define an opening 16 in the housing 11. The opening 16 is of generally rectangular configuration and the internal surfaces of the opening defined by the side walls 12 and 13 are machined for mounting of a plurality of brake shoes 17 there against. In FIG. 1, three brake shoes 17 are mounted to each side wall 12 and 13 and each brake shoe consists of a metal backing plate 18 and a friction lining 19. While these parts of the brake shoes can be seen from FIG. 1, they are better illustrated in FIG. 2

Figure 2:
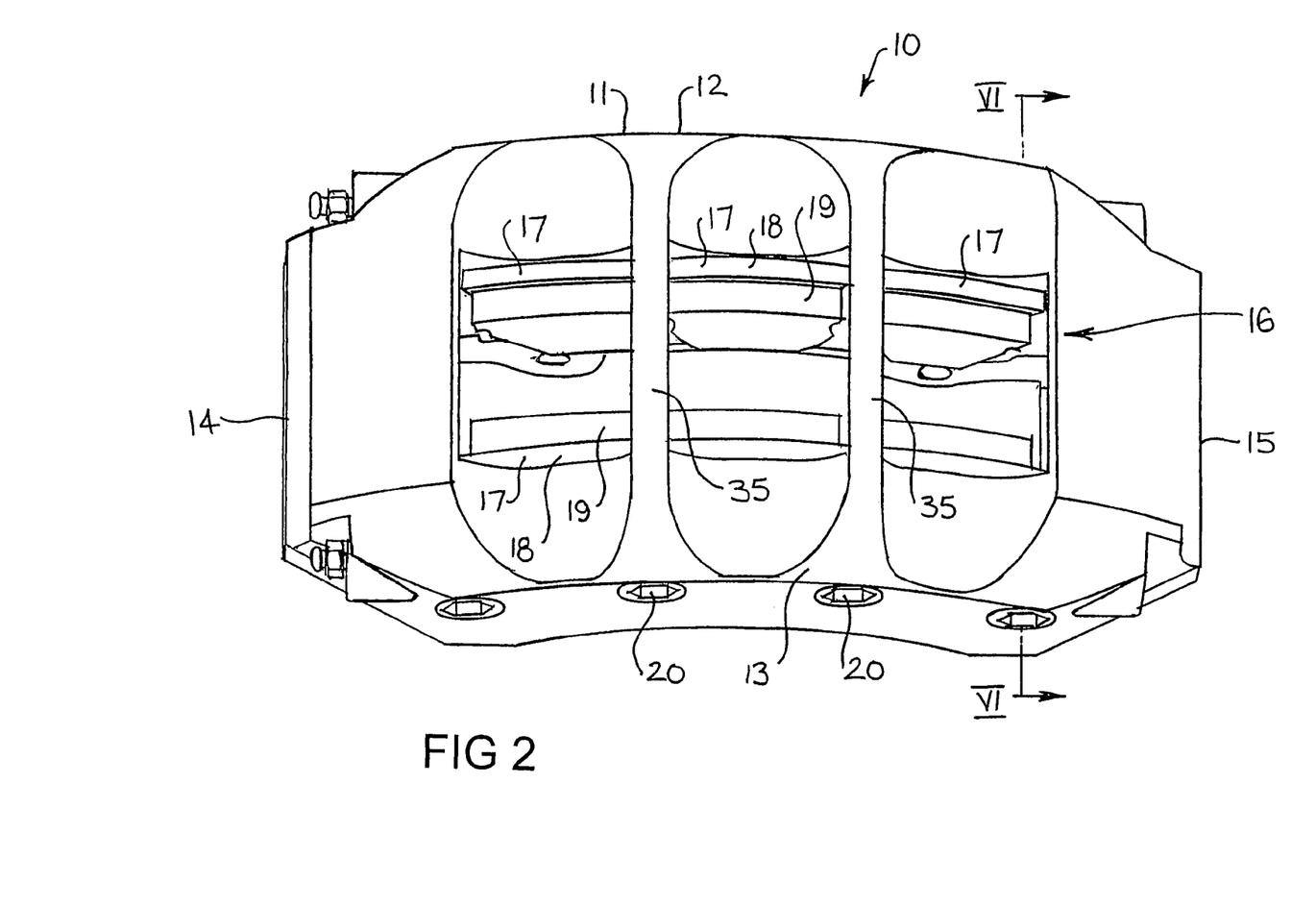
FIG. 2 is a plan view of the disc brake caliper of FIG. 1.
Figure 3:
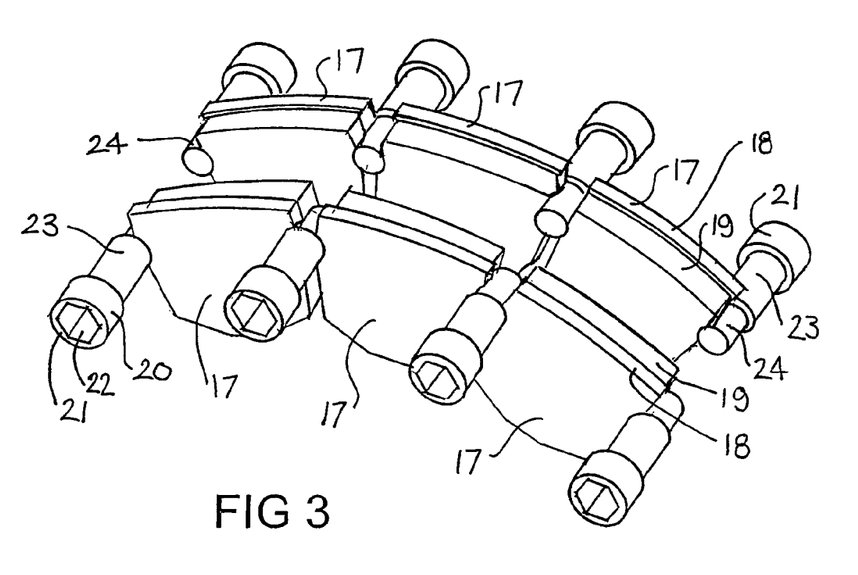
FIG. 3 is a shows an internal arrangement of the disc brake caliper.
Figure 4:
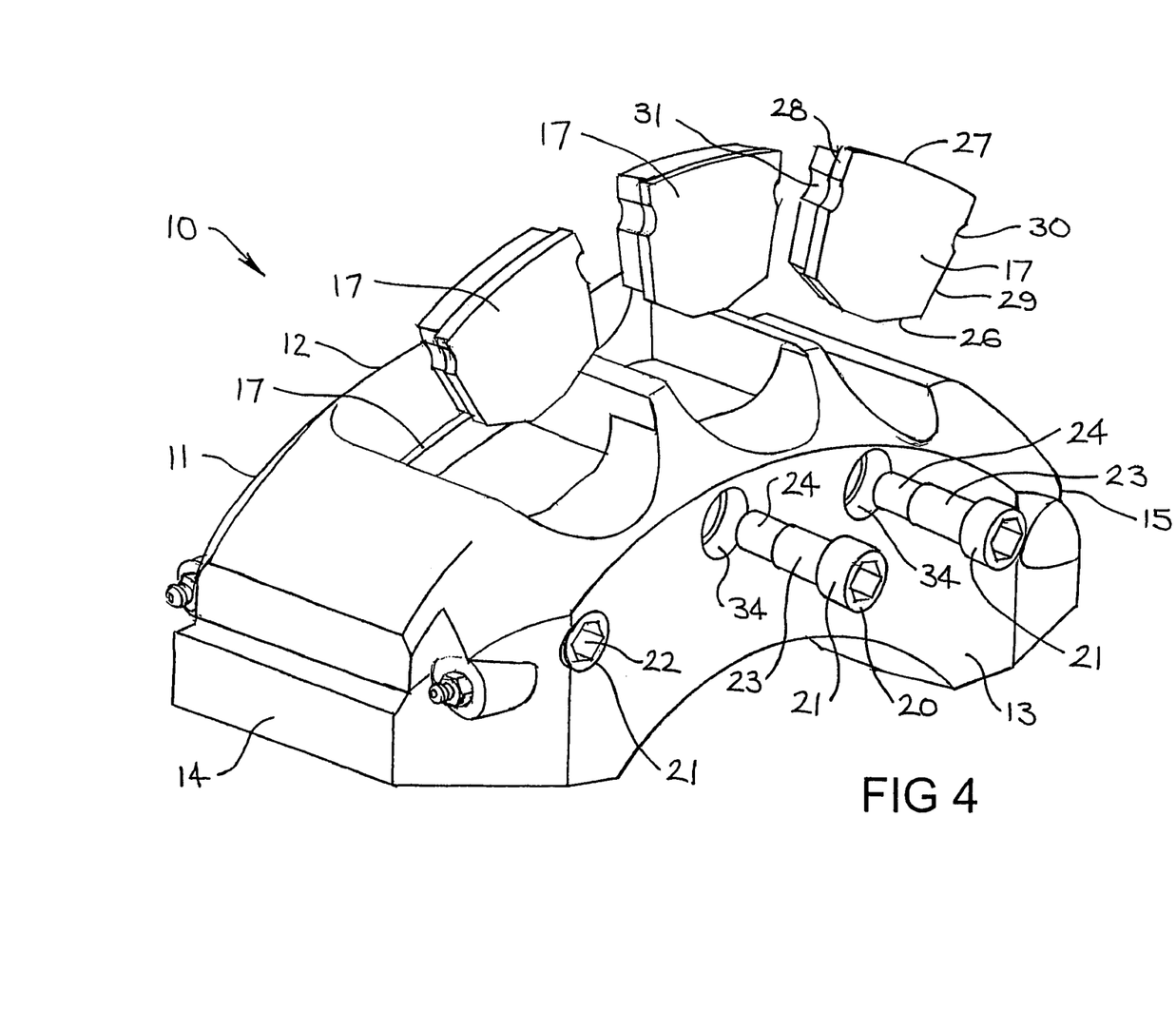
FIG. 4 is a perspective view of the disc brake caliper of FIG. 1 showing brake pads and mounting pins removed.

The brake shoes 17 are mounted within the housing 11 in a unique manner, by mounting members which are illustrated clearly in FIGS. 3 and 4. Referring to FIG. 3, the brake shoes of FIGS. 1 and 2 are shown and it can be seen that these are aligned side by side and one set of three brake shoes is spaced apart from the other set of three shoes. That spacing is to accommodate a disc brake rotor which is not shown in any of the drawings, but which would be disposed between the sets of brake shoes, so that the brake shoes can be shifted into engagement with the rotor to apply a braking effect.

The mounting members shown in FIG. 3 consist of a plurality of threaded pins 20 which include a head 21 incorporating a hexagonal recess 22 for receipt of a complimentary shaped driving tool, a threaded shaft portion 23 and a non-threaded shaft portion 24. The threaded portion 23 has a greater diameter than the shaft portion 24 and therefore a step is defined at the junction between the respective portions 23 and 24.

Referring to FIG. 4, each brake shoe 17 is of generally rectangular configuration, having a radially inner edge 26, a radially outer edge 27 and side edges 28 and 29. The brake shoes 17 are not strictly rectangular as can be seen from FIG. 4, as the inner edge 26 is formed of three flat surfaces, the outer edge 27 is curved and the side edges 28 an 29 are angled slightly inward. The brake shoe configuration can be configured in any suitable manner such as that shown or as otherwise required.

As is evident in FIGS. 3 and 4, the side edges 28 and 29 each include a part-circular slot or groove 30, while the friction lining also includes a slot or groove 31 coaxially aligned with the groove 30. The radius of each of the grooves 30 and 31, is slightly greater than the radius of the shaft portion 24 of the pins 20 so that the grooves 30 and 31 are a snug fit about the shaft portions 24. As is shown in FIG. 3, the shaft portion 24 of each mounting pin 20 is disposed in each of the grooves 30 and 31 of each brake shoe 17. It should be clear that the arrangement shown in FIG. 3 will permit each of the brake shoes to move axially with respect to the shaft portion 24 of each of the mounting pins 20, but to be substantially restrained against movement transverse to the axial extent of the shaft portion 24. Thus, by the arrangement shown, movement of each of the brake shoes 17 can be achieved to facilitate engagement of the friction lining 19 of each brake shoe 17 with the disc brake rotor (not shown) disposed between the sets of brake shoes, but to restrain the brake shoes against movement in other directions. This arrangement is further shown in FIG. 5, although the FIG. 5 arrangement relates to an assembly which includes only a pair of brake shoes disposed on either side of the rotor. In this respect, a disc brake caliper according to the invention can have any number of brake shoes disposed on either side of the rotor and therefore FIG. 5 is illustrative of an alternative arrangement, which is otherwise operable in a very similar manner to the FIGS. 1 to 4 arrangements.

Figure 5:
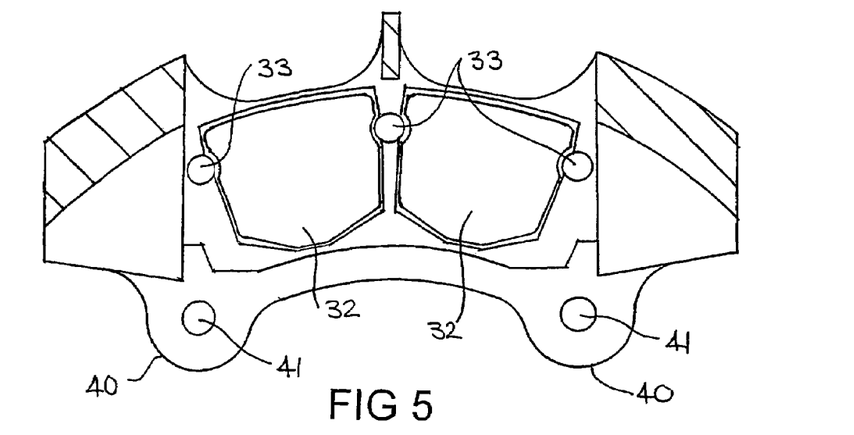
FIG. 5 is a cross-sectional view through the pad arrangement of a two brake shoe disc brake caliper.

In the FIG. 5 arrangement, the brake shoes 32 are of the same construction and dimensions as the brake shoes 17 of the earlier figures. Accordingly, it is not necessary to further describe these. Likewise, the mounting members 33 each have the same construction as the mounting pins 20 of the earlier figures. Again, it is therefore unnecessary to further describe those members. FIG. 5 shows the snug mating engagement between the outer surface of the mounting members 33 and the slot or grooves formed in each of the brake shoes 32. It will be readily seen from this view that the shoes are constrained against rotating movement, or against lifting movement, but as explained earlier, the brake shoes can move axially with respect to the mounting members 33.

Referring to FIG. 4, the brake shoes 17 may be mounted within the housing 11 by positioning each brake shoe against the machined side wall surface and inserting each mounting pin 20 into threaded engagement in the housing 11. For this, FIG. 4 shows openings 34 machined into the housing 11 and to which a thread is applied for threaded engagement with the threaded shaft portion 23 of each mounting pin 20. By this arrangement, the mounting pins 20 can be easily removed when one or more of the brake shoes 17 is to be removed, although it will be appreciated that it is not necessary to remove each of the mounting pins 20 and with reference to FIG. 5, the center mounting pin 33 can be removed to facilitate removal of each of the brake shoes 32, without also requiring removal of the other two mounting pins 33. In the FIG. 4 arrangement, to remove each of the three brake shoes 17 on one side wall of the housing 20, the two mounting pins 20 shown removed from the openings 34 can be removed, without needing also to remove the other pair of mounting pins 20 disposed outside the pair of central pins. It is therefore acceptable, for the outside pair of mounting pins 20 to be permanently fixed within the housing 11 or to be formed integrally therewith, rather than being a separate pin which is fixed in the housing. In one alternative, the pins may be a friction fit within an opening formed in the housing 11, with the intention that they remain as a permanent part of that housing, or the shaft portions 24 of the mounting pins 20 maybe formed by a cast protrusion which extends from the machined surface of the side walls 12 and 13, instead of being a separate installable pin.

Figure 6:
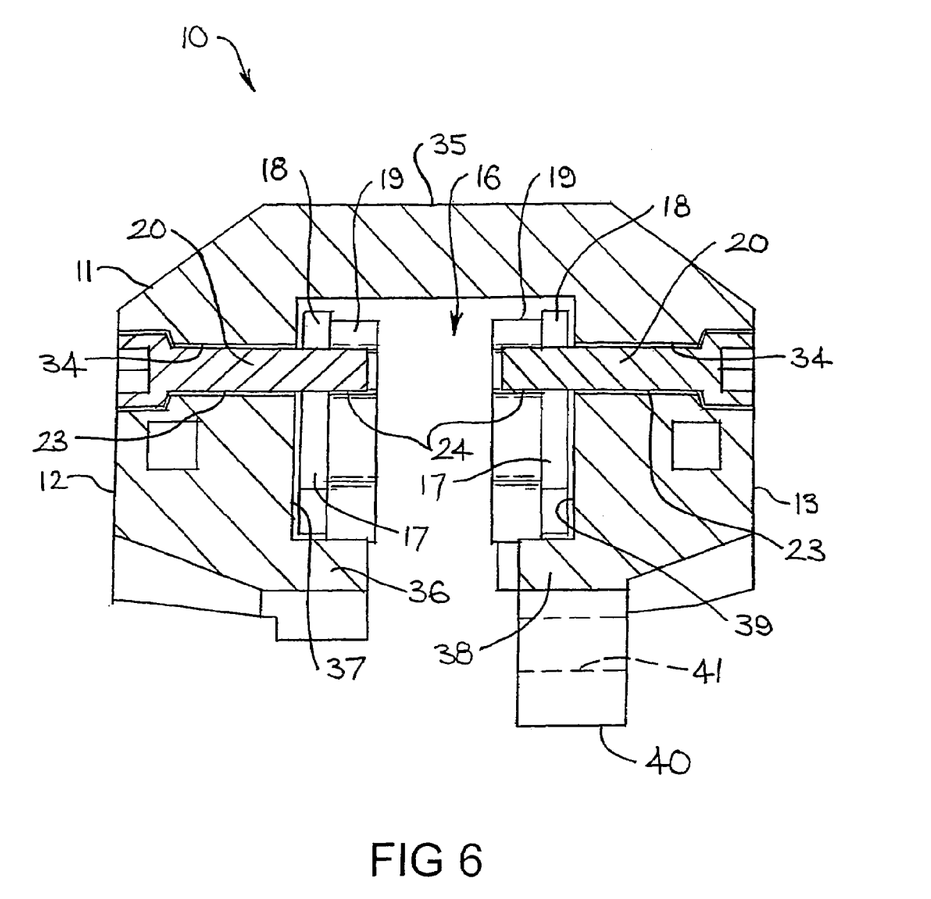
FIG. 6 is a cross-sectional view taken through VI-VI of FIG. 2.

The extent of the mounting pins 20 into the opening 16 of the housing 11 is required to be sufficient for each brake pad to be shifted axially into engagement with the rotor and to still maintain engagement with the shaft portion 24. FIG. 6 represents a cross-sectional view taken through VI-VI of FIG. 2 and clearly shows the mounting pins 20 received and fastened within the openings 34, while the unthreaded shaft portion 24 extends into the opening 16 in engagement with the side edges of the brake shoes 17. It is also clear from FIG. 6, that the shaft portion 24 extends for about twice the axial thickness of the backing plates 18 so that brake shoe movement toward a rotor disposed between the brake shoes 17 is facilitated without disconnection between the brake shoes 17 and the shaft portions 24. It will be appreciated, that as the friction linings 19 wear, that the brake shoes 17 will travel a greater distance to engage the rotor and this is the reason for providing a significant axial extent of the shaft portions 24.

Returning to FIGS. 1 and 2, bars 35 extend transversely across the opening 16 generally parallel to the end walls 14 and 15 and transverse to both the plane of the rotor and the side walls 12 and 13. The bars 35 are formed as an integral casting of the housing 11, although they could be alternatively connected as separate components. As shown, the bars are spaced apart in equal increments from themselves and from the end walls 14 and 15. There is no strict requirement for this spacing although it also means that the bars 35 are aligned with the centre pair of mounting pins 20.

The bars 35 increase the stiffness of housing 11 under braking conditions and resist bending of the side walls 12 and 13 in such conditions. However, the provision of the bars 35 as shown also facilitates insertion or removal of individual brake shoes 17 upon removal of the required number of mounting pins 20. Thus the caliper 10 does not need to be fully removed from a wheel assembly of a vehicle to which it is fitted for removal of one or more of the brake shoes 17. Instead, it is a relatively simply matter of removing the required number of mounting pins 20 and then removing through the opening 16, the required number of brake shoes 17. FIG. 4 is illustrative of this method, in which two of the mounting pins 20 are shown removed from the housing 11, to facilitate complete removal of three of the brake shoes 17.

Referring to FIG. 6, a further stiffen mechanism is applied to the caliper 10 to increase overall caliper stiffness. In FIG. 6, the bar 35 is shown but additional to this, the side wall 12 includes an axial extension 36 which extends from the machined surface 37 of the side wall 12 axially toward the rotor or opposite side wall 13. To obtain the stiffness benefit, the axial extension 36 extends in connection with end wall 14 fully to and in connection with the end wall 15. Thus, the axial extension is effectively a ledge which is formed along the full internal length of the side wall 12.

For further enhancing the housing stiffness, a second axial extension 38 extends from the machined surface 39 of the side wall 13. That axial extension extends axially inwardly and fully between the respective end walls 14 and 15. The provisions of the axial extension 38 is not as important as the opposite extension 36, because the side wall is already stiffened to a certain extent by the provision of a mounting knuckle 40 which serves to mount the housing 11 to the wheel assembly. The knuckle 40 may take any suitable shape or form to achieve its mounting requirement. For example and referring to FIG. 5, the knuckle is a radius extension of the side wall 13 and includes an opening 41 to receive a fixing bolt (not shown). However, any suitable mounting means or arrangement may be employed for mounting the housing to the wheel assembly.

Figure 7:
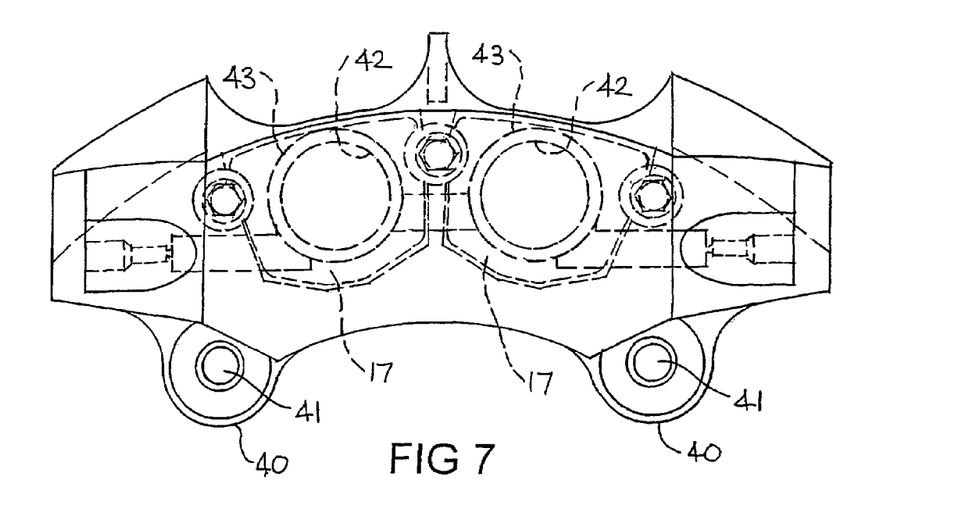
FIG. 7 is a view of the FIG. 5 illustration shown pistons and piston bores.

The brake shoes 17 or 32 are displaced towards a disc brake rotor generally by hydraulic pistons and as discussed previously, the use of multiple brake shoes as shown in each of the earlier figures, permits the pistons and their associated piston bores to be of the same dimensions throughout the caliper. FIG. 7 represents this arrangement, in which the pistons 42 and their associated bores 43 are of identical dimensions. This arrangement will still entail tapered wear of each brake shoe friction lining, but because the brake shoes have a reduced length in the direction of rotor rotation. The degree of tapering wear of each brake shoe will be less than the tapered wear of a single brake shoe.

It will appreciated that the figures show a single piece housing, or monoblock housing construction, although alternatively, the housing could be cast and machined in two parts and then bolted or otherwise connected together. It should also be appreciated, that the caliper 10 does not show a biasing spring engaging the brake shoes 17 or 32, however it is envisaged that such a spring would be included as an anti-rattling device, to urge the brake shoes into firm connection with each mounting pin 20. The spring could act on either of the brake shoe edges 26 or 27 and a single spring may be provided to engage all of the brake shoes of the caliper 10, or all of the brake shoes mounted on one side of the caliper 10, or a single brake shoe each. The spring could take a variety of different forms, although a leaf spring is envisaged.

The invention described herein is susceptible to variations, modifications and/or additions other than those specifically described and it is to be understood that the invention includes all such variations, modifications and/or additions which fall within the spirit and scope of the above description.

The invention claimed is:

1. An opposed piston disc brake caliper comprising:
   a caliper housing arranged for mounting a pair of brake shoes adjacent to each other on each side of a rotor, said rotor being disposed between adjacent pairs of brake shoes, each of said brake shoes having a backing plate and a friction lining applied to said backing plate, each backing plate having a radially inner edge and a radially outer edge relative to said rotor when mounted in said caliper housing and side edges extending therebetween;
   a piston associated with each of said brake shoes and being operable to shift said respective brake shoe toward said rotor for engagement of said friction lining with said rotor to effect braking, said caliper housing accommodating said pistons; and
   three mounting members extending from side walls of said caliper housing on each side of said rotor, said mounting members extending in a direction toward but terminating prior to said rotor, each side edge of each backing plate being engaged by one of said mounting members such that two of said three mounting members are positioned to respectively engage an outer of said side edges of said backing plates of said brake shoes, and a third of said three mounting members is positioned to engage an inner of said side edges of each of said backing plates of said brake shoes, wherein said engagement substantially limits movement of each brake shoe other than in a direction toward or away from said rotor, and wherein said third mounting member is removable, and following removal of only the third mounting member, each of said pair of brake shoes can be removed from said caliper housing.

2. The opposed piston disc brake caliper according to claim 1, wherein each of said mounting members is removable.

3. The opposed piston disc brake caliper according to claim 1, wherein said mounting members are formed as pins.

4. The opposed piston disc brake caliper according to claim 1, wherein one or more of said mounting members are threadably received in one or more openings formed in said caliper housing.

5. The opposed piston disc brake caliper according to claim 4, wherein said one or more openings extend through said caliper housing so that said one or more of said mounting members can be threaded into position and removed from a location outside said caliper housing.

6. The opposed piston disc brake caliper according to claim 1, wherein said backing plate of each of said brake shoes includes a slot formed in each of said side edges thereof, and wherein said mounting members have an outer surface to engage said respective slots.

7. The opposed piston disc brake caliper according to claim 6, wherein said slots are substantially concave.

8. The opposed piston disc brake caliper according to claim 7, wherein said mounting members are formed as pins having a generally circular cross-section, and wherein said slots define a generally curved concave internal surface complementary to an outer surface of one of said plurality of mounting members received within said slots.

9. The opposed piston disc brake caliper according to claim 1, wherein said opposed piston disc brake caliper has two brake shoes mounted on each side of said rotor, said caliper housing including end walls which extend transverse to said side walls and are connected therebetween, and said end walls and said side walls defining an opening, a bar extending across the opening transverse to said side walls for increasing the stiffness of said caliper housing against an outward bending of said side walls during braking, said brake shoes being removable from said caliper housing through said opening, past said bar when the opposed piston disc brake caliper is installed about said rotor.

10. The opposed piston disc brake caliper according to claim 1, further comprising a first mounting means for mounting said brake shoes within said caliper housing, and a second mounting means for mounting the opposed piston disc brake caliper to a wheel assembly, said second mounting means extending from said caliper housing on one side of said rotor, said caliper housing including end walls extending transverse to said side walls and are connected therebetween, an axial extension extending axially from a first of said side walls in a direction toward said rotor from a position adjacent said radially inner edge and fully along said first side wall to connect with each of said end walls, wherein said first side wall is disposed on a rotor side opposite to said second mounting means.

11. The opposed piston disc brake caliper according to claim 10, wherein said caliper housing includes a second axial extension extending axially from a second of said side walls in a direction toward said rotor from a position adjacent said radially inner edge and fully along said second of said side walls to connect with each of said end walls and being disposed on the same side of said rotor as that of said second mounting means.

12. An opposed piston disc brake caliper comprising:
a caliper housing arranged for mounting three brake shoes adjacent to one another on each side of a rotor, the three of said brake shoes comprising a pair of outer brake shoes and a central brake shoe, said rotor being disposed between each group of three brake shoes, each of said brake shoes having a backing plate and a friction lining applied to said backing plate, each backing plate having a radially inner edge and a radially outer edge relative to said rotor when mounted in said caliper housing and side edges extending therebetween;
a piston associated with each of said brake shoes and being operable to shift said respective brake shoe toward said rotor for engagement of said friction lining with said rotor to effect braking, said caliper housing accommodating said pistons; and
four mounting members extending from side walls of said caliper housing on each side of said rotor, said mounting members extending in a direction toward but terminating prior to said rotor, each side edge of each backing plate being engaged by one of said mounting members such that two of said four mounting members are positioned to respectively engage an outer of said side edges of said backing plates of each of said outer brake shoes and two of said four mounting members are positioned to engage respectively each of said side edges of said backing plate of said central brake shoe and an adjacent inner one of said side edges of said backing plates of said outer brake shoes, wherein said engagement substantially limits movement of each brake shoe other than in a direction toward or away from said rotor, and wherein said mounting members which are positioned to engage said side edges of said backing plate of said central brake shoe are each removable and following removal of only one of said removable mounting members, two of said brake shoes can be removed from said caliper housing.

13. The opposed piston disc brake caliper according to claim 12, wherein each of said mounting members is removable.

14. The opposed piston disc brake caliper according to claim 12, wherein said mounting members are formed as pins.

15. The opposed piston disc brake caliper according to claim 12, wherein one or more of said mounting members are threadably received in one or more openings formed in said caliper housing.

16. The opposed piston disc brake caliper according to claim 15, wherein said one or more openings extend through said caliper housing so that one or more of said mounting members can be threaded into position and removed from a location outside said caliper housing.

17. The opposed piston disc brake caliper according to claim 12, wherein said backing plate of each of said brake shoes includes a slot formed in each of said side edges thereof, and wherein said mounting members have an outer surface to engage said respective slots.

18. The opposed piston disc brake caliper according to claim 17, wherein said slots are substantially concave.

19. The opposed piston disc brake caliper according to claim 18, wherein said mounting members are formed as pins having a generally circular cross-section, and wherein said slots define a generally curved concave internal surface complementary to an outer surface of one of said plurality of mounting members received within said slots.

20. The opposed piston disc brake caliper according to claim 12, wherein said opposed piston disc brake caliper has three brake shoes mounted on each side of said rotor, said caliper housing including end walls which extend transverse to said side walls and are connected therebetween, and said end walls and said side walls defining an opening, a bar extending across the opening transverse to said side walls for increasing the stiffness of said caliper housing against an outward bending of said side walls during braking, said brake shoes being removable from said caliper housing through said opening, past said bar when the opposed piston disc brake caliper is installed about said rotor.

21. The opposed piston disc brake caliper according to claim 12, further comprising a first mounting means for mounting said brake shoes within said caliper housing, and a second mounting means for mounting the opposed piston disc brake caliper to a wheel assembly, said second mounting means extending from said caliper housing on one side of said rotor, said caliper housing including end walls extending transverse to said side walls and are connected therebetween, an axial extension extending axially from a first of said side walls in a direction toward said rotor from a position adjacent said radially inner edge and fully along said first side wall to connect with each of said end walls, wherein said first side wall is disposed on a rotor side opposite to said second mounting means.

22. The opposed piston disc brake caliper according to claim 21, wherein said caliper housing includes a second axial extension extending axially from a second of said side walls in a direction toward said rotor from a position adjacent said radially inner edge and fully along said second of said side walls to connect with each of said end walls and being disposed on the same side of said rotor as that of said second mounting means.

* * * * *